(12) United States Patent
De Oliveira

(10) Patent No.: US 11,551,017 B2
(45) Date of Patent: Jan. 10, 2023

(54) RFID SYSTEM WITH IMPROVED SIGNAL TRANSMISSION CHARACTERISTICS

(71) Applicant: PRAGMATIC PRINTING LTD., Sedgefield (GB)

(72) Inventor: Joao De Oliveira, Sedgefield (GB)

(73) Assignee: PRAGMATIC PRINTING LTD., Sedgefield (GB)

( * ) Notice: Subject to any disclaimer, the term of this patent is extended or adjusted under 35 U.S.C. 154(b) by 0 days.

(21) Appl. No.: 17/296,381

(22) PCT Filed: Dec. 3, 2019

(86) PCT No.: PCT/GB2019/053409
§ 371 (c)(1),
(2) Date: May 24, 2021

(87) PCT Pub. No.: WO2020/128424
PCT Pub. Date: Jun. 25, 2020

(65) Prior Publication Data
US 2022/0036019 A1    Feb. 3, 2022

(30) Foreign Application Priority Data

Dec. 21, 2018 (GB) .................................. 1820964

(51) Int. Cl.
*G06K 7/10* (2006.01)
*G06K 19/07* (2006.01)
(Continued)

(52) U.S. Cl.
CPC ..... *G06K 7/10366* (2013.01); *G06K 7/10336* (2013.01); *G06K 19/0723* (2013.01); *G06K 19/07777* (2013.01); *H04B 5/0037* (2013.01)

(58) Field of Classification Search
CPC ....................... G06K 7/10366; G06K 19/0723
(Continued)

(56) References Cited

U.S. PATENT DOCUMENTS

2002/0097153 A1* 7/2002 Youbok .............. G06K 19/0726
340/572.1
2003/0214774 A1   11/2003 Locatelli et al.
(Continued)

OTHER PUBLICATIONS

Ricketts, David S. et al. "Experimental Demonstration of the Equivalence of Inductive and Strongly Coupled Magnetic Resonance Wireless Power Transfer" Applied Physics Letters 102; Feb. 2013.
(Continued)

*Primary Examiner* — Allyson N Trail
(74) *Attorney, Agent, or Firm* — Jason H. Vick; Sheridan Ross, PC

(57) ABSTRACT

A RFID (Radio Frequency Identification) system is provided, comprising at least one tag assembly having at least one tag inductance element that is operatively coupled to an integrated circuit (IC). The RFID system further comprises at least one reader assembly having at least one reader inductance element that is configured to operatively and communicatively couple with the tag assembly, and a resonance assembly having at least one first resonance element that is inductively coupleable to the at least one tag inductance element and/or at least one second resonance element that is inductively coupleable to the at least one reader inductance element, and which is adapted to provide coupled magnetic resonance signal transmission between the reader assembly and the tag assembly.

19 Claims, 5 Drawing Sheets

(51) Int. Cl.
*G06K 19/077* (2006.01)
*H04B 5/00* (2006.01)

(58) Field of Classification Search
USPC .................................................. 235/451
See application file for complete search history.

(56) References Cited

U.S. PATENT DOCUMENTS

| | | |
|---|---|---|
| 2006/0049947 A1 | 3/2006 | Forster |
| 2006/0208899 A1 | 9/2006 | Suzuki et al. |
| 2007/0008140 A1 | 1/2007 | Saarisalo et al. |
| 2007/0257800 A1* | 11/2007 | Yang .................. G06K 19/073 343/841 |
| 2010/0038437 A1* | 2/2010 | Kato ................ G06K 19/07783 235/492 |
| 2012/0004851 A1* | 1/2012 | Potyrailo ........... G01N 33/0073 702/65 |
| 2012/0066702 A1* | 3/2012 | Salfelner .............. G06K 19/045 |
| 2014/0141715 A1 | 5/2014 | Smith |
| 2014/0263635 A1* | 9/2014 | Jones .................. G06Q 10/087 235/385 |
| 2015/0087243 A1* | 3/2015 | Murayama .......... H01Q 1/2225 455/73 |
| 2015/0170018 A1 | 6/2015 | Loussert et al. |
| 2017/0288459 A1* | 10/2017 | Georgakopoulos ..... H01F 38/14 |
| 2017/0353055 A1 | 12/2017 | Han et al. |
| 2021/0342600 A1* | 11/2021 | Westmacott .......... G06V 20/56 |

OTHER PUBLICATIONS

Wikipedia "Resonant Inductive Coupling" available at https://en.wikipedia.org/wiki/Resonant_inductive_coupling; Apr. 5, 2021.
International Search Report for International Application No. PCT/GB2019/053409, dated Feb. 13, 2020.
Written Opinion for International Application No. PCT/GB2019/053409, dated Feb. 13, 2020.
Combined Search and Examination Report Under Sections 17 and 18(3) for Great Britain Application No. 1820964.3, dated Jun. 12, 2019.
International Preliminary Report on Patentability for International Application No. PCT/GB2019/053409, dated Jul. 1, 2021.

* cited by examiner

RFID SYSTEM WITH IMPROVED SIGNAL TRANSMISSION CHARACTERISTICS

CROSS REFERENCE TO RELATED APPLICATIONS

This application is a national stage application under 35 U.S.C. 371 of PCT Application No. PCT/GB2019/053409, having an international filing date of 3 Dec. 2019, which designated the United States, which PCT application claimed the benefit of Great Britain Application No. 1820964.3, filed 21 Dec. 2018, each of which are incorporated herein by reference in their entirety.

FIELD

The present invention generally relates to an RFID (Radio Frequency Identification) system utilising tag(s) and reader(s) for identifying, locating and tracking objects and, in particular, to an RFID system capable of providing improved signal transmission characteristics between the tag(s) and reader(s).

Introduction (i) RFID (Radio-Frequency Identification)

Applications of radio-frequency identification (RFID) are widespread in today's well-connected world. RFID uses radio frequency (RF) signals to identify and track objects, such as, for example, vehicles, shipping containers, equipment, tools and even personnel utilising so called tags (i.e. transponders) that are attached to the object. In some cases, RFID may also be used to provide information about the tracked object's state, such as, for example, temperature, humidity or a precise location.

In general, RFID operates according to international and national standards and within a number of distinct frequency bands dedicated to respective standards. Typically, RFID systems are categorised according to the operating frequency. For example, Low-Frequency (LF) RFID operates at 125 KHz to 134 KHz (kilohertz), offering data communication that is limited to data rates of less than 1 kbits/s (kilobits per second) and operating ranges of less than 1 m (meter). High-Frequency (HF) RFID operates at 13.56 MHz (megahertz) offering data communication with data rates approaching 25 kbits/s and operating ranges of up to 1.5 m. Ultra-High-Frequency (UHF) RFID typically operates in the 860 MHz to 960 MHz frequency band offering data rates of up to 100 kbits/s and operating ranges of up to 10 m. Microwave (MW) RFID operates at 2.45 GHz and 5.8 GHz (gigahertz) offering further increase in data rates and operating range.

Depending on their operating principle, tags may be classified into three categories (i) passive tags, (ii) semi-passive tags and (iii) active tags. Passive tags have no internal power supply and utilise the signal energy transmitted by the reader (i.e. interrogator) to power the tags internal circuit and communicate with the reader. Semi-active tags have an internal power supply, but the tags are only activated to establish communication when "interrogated" by a reader. Active tags have an internal power supply, such as, for example, a battery, and a transmitter that is periodically transmitting the tag's ID or other tag information. The ID and/or other tag information is then picked up by an interrogating reader to simply track an associated object, or to establish a communication link between the reader and the tag.

Understandably, passive tags are the most popular, because they are the least complex and cheapest to manufacture. Due to the lower complexity, passive tags are smaller, more reliable and do not run out of battery power. Typically, passive RFID tags comprise (i) one or more integrated circuits (IC) for storing and processing information, as well as, modulating (and demodulating) the signal received from the reader, (ii) a component for extracting power from the incident reader signal, and (iii) an antenna structure that is suitable for receiving and/or modulating the interrogating signal.

FIG. 1 shows a simplified illustration of a typical RFID system 10 including at least one reader 12 (usually a microcontroller-based unit) and one or more tags 14, such as, for example passive tags 14. In operation, the reader transmits a radio frequency (RF) 16 signal to energize the at least one tag 14. The tag 14 then modulates (illustrated by backscatter 16) the RF carrier signal (e.g. load modulation) with its stored ID information and the load fluctuations of the carrier signal are then detected and decoded by the reader 12.

(ii) Strongly Coupled Magnetic Resonance (SCMR)

Although the foundations were first conceived by Nikola Tesla over 100 years ago, SCMR was first brought to practical realisation by the Soljačić group at the MIT department of physics in 2007. SCMR has since emerged as a complementary wireless power transfer technology to more conventional (i.e. non-resonant) inductive coupling, however by using a particular impedance matching network for inductive coupling, it has been shown (for example by Ricketts et. al., "Experimental demonstration of the equivalence of inductive and strongly coupled resonance wireless power transfer", Applied Physics Letters 102, 2013) that the physics of the two are essentially equivalent.

FIG. 2 shows a simplified schematic of an inductive system 20 to illustrate the principle of inductive coupling between a transmitter 22 and a receiver (load) 24. The transmitter coil L1 generates a strong changing magnetic field B which induces a voltage across the receiver coil L2.

FIG. 3 shows a simplified schematic of a system 30 suitable for SCMR, the system 30 includes a source resonant coil 32 coupled to a simple loop antenna 34 and a device resonant coil 36 coupled to simple loop antenna 38. In general, SCMR transmits power between the two resonant coils 32 and 36 that are tuned to the same frequency. The signal is coupled inductively into the source resonant coil 32 via the simple loop antenna 34 and is then recovered from the device resonant coil 36 via the other simple loop antenna 38. Loop antenna 38 may be coupled to a load circuit 40.

Direct coupling between loop antennas 34 and 38 may be non-existent, however, the highly sensitive transfer of power between the strongly-coupled resonant coils 32 and 36 can provide a reasonably efficient transmission from loop antenna 34 to loop antenna 38 via resonant coils 32 and 36. Also, in contrast to radiative power transmission, SCMR is not necessarily strongly directional, i.e. it allows resonant coils 32 and 36 to transfer power efficiently irrespective of how the coils 32 and 36 are arranged with respect to each other. Further, wireless power transfer using SCMR may also be relatively insensitive to the presence of objects between the two resonant coils 32 and 36.

SCMR has mainly been of interest for pure power transfer over so-called 'mid-range' distances, i.e. up to 2 m, for electric vehicles, mobile electronic devices, medical implants etc., as it has been shown that SCMR may collapse if the resonant coils are brought within a minimum separation distance of each other. Furthermore, due to the required high Q factor (quality factor) of the coupled resonator coils, SCMR may exhibit a lower bandwidth that inductive coupling.

Consequently, power extraction (and signal transmission) with currently available antenna designs and the resulting performance (e.g. operating range and data rates) of present RFID systems (i.e. cooperating reader and tag(s)) is still relatively inefficient and depends heavily on individual tag designs, as well as, the operating environment.

Accordingly, it is an object of the present invention to provide a RFID system, including reader(s) and tag(s), with improved performance and an increased efficiency.

SUMMARY

Preferred embodiment(s) of the invention seek to overcome one or more of the disadvantages of the prior art.

According to a first embodiment of the invention, there is provided a RFID (Radio Frequency Identification) system, comprising at least one tag assembly that comprises at least one tag inductance element that is operatively coupled to an integrated circuit (IC), at least one reader assembly that comprises at least one reader inductance element and that is configured to operatively and communicatively couple with said tag assembly. The RFID system further comprises a resonance assembly that comprises at least one first resonance element inductively coupleable to said at least one tag inductance element and/or at least one second resonance element that is inductively coupleable to said at least one reader inductance element, and which is adapted to provide coupled magnetic resonance signal transmission between said reader assembly and said tag assembly. Preferably, said coupled magnetic resonance signal transmission may be a strongly-coupled magnetic resonance (SCMR) signal transmission. This provides the advantage of a significantly improved power transfer between the reader and at least one "coupled" tag resulting in an increase in power received by the RFID tag IC, therefore providing an increased operating range between the reader and the tag(s), as well as, an increased sensitivity of the RFID reader to any communication received from the RFID tag(s). In addition, the RFID system of the present invention provides the advantage to allow RFID tag designs including tag antenna(s) with significantly reduced size, therefore allowing the use of smaller tags, but with increased performance parameters.

Advantageously, when said resonance assembly comprises only said at least one first resonance element, said at least one first resonance element may be adapted to couple resonantly with said at least one reader inductance element. Alternatively, when said resonance assembly comprises only said at least one second resonance element, said at least one second resonance element may be adapted to couple resonantly with said at least one tag inductance element.

This provides the advantage of a wireless power transfer (WPT) with improved efficiency when compared to systems without any resonant coupling element (tag and/or reader).

In another alternative embodiment, when said resonance assembly comprises both said at least one first resonance element and said at least one second resonance element, said at least one first resonance element may be adapted to couple resonantly with any one of said at least one second resonance element and said at least one reader inductance element of said at least one reader assembly, and said at least one second resonance element may be adapted to couple resonantly with any one of said at least one first resonance element and said at least one tag inductance element of said at least one tag assembly. Preferably, the RFID system may be further adapted to selectively utilise any one or any combination of said at least one tag inductance element, said at least one first resonance element, said at least one reader inductance element and said at least one second resonance element to provide strongly-coupled magnetic resonance (SCMR) signal transmission between said at least one reader assembly and said at least one tag assembly.

This provides the advantage of an adaptable RFID system that always "seeks" the most efficient power transfer transmission link between the reader and tag(s), whether respective suitable resonance elements are provided only in the tag(s), only in the reader(s) or both.

Advantageously, any one or any combination of said at least one tag inductance element, said at least one first resonance element, said at least one reader inductance element and said at least one second resonance element may be selected in accordance with at least one predetermined condition. Preferably, said at least one predetermined condition may be a predetermined characteristic of the signal transmission between said reader assembly and said tag assembly. Even more preferably, said predetermined characteristic may be any one of a predetermined signal frequency and signal amplitude.

Advantageously, at least one characteristic property of said at least one first and said at least one second resonance element may be optimally matched for strongly-coupled magnetic resonance (SCMR) signal transmission. Preferably, said at least one characteristic property may be a respective impedance of said at least one first resonance element and said at least one second resonance element.

Advantageously, said at least one first resonance element may be operatively coupled to a first capacitance of said at least one tag assembly. Additionally, said first capacitance may be selectively tuneable.

Advantageously, said at least one second resonance element may be operatively coupled to a second capacitance of said at least one reader assembly. Preferably, said second capacitance may be selectively tuneable.

A tuneable capacitance for respective first or second resonance element provides the advantage that tag(s) and reader(s) can be "tuned" so as to provide an optimised "coupling" between the reader(s) and the tag(s).

Advantageously, said resonance assembly may be configured to provide power to said at least one tag assembly and exchange information between said at least one reader assembly and said at least one tag assembly. Preferably, said at least one resonance assembly may be configured to exchange information via load modulation.

Advantageously, said at least one tag inductance element may be any one of a Near-Field Communication (NFC) antenna and a RFID antenna.

Advantageously, said reader inductance element may be any one of a Near-Field Communication (NFC) antenna and a HF (High Frequency) RFID antenna.

Advantageously, said at least one tag inductance element, said at least one reader inductance element, said at least one first resonance element and said at least one second resonance element may each be provided by any one of at least one single loop coil and at least one spiral coil.

Advantageously, said IC of said at least one tag assembly may be adapted to operate with at least one RFID protocol utilising at least one predetermined data transmission frequency. Preferably, said IC of said at least one tag assembly may be adapted to operate with a plurality of different RFID protocols. Even more preferably, each one of said plurality of different RFID protocols may be configured to utilise an identical or a different predetermined transmission frequency. Even more preferably, said IC may further be adapted to selectively utilise any one of said plurality of different RFID protocols.

Advantageously, said at least one tag assembly may comprise a first IC, adapted to operate with a first RFID protocol at a predetermined first transmission frequency, and at least one second IC, adapted to operate with a second RFID protocol at a predetermined second transmission frequency. Preferably, said at least one tag assembly may be adapted to selectively utilise any one of said first IC and said at least one second IC. Even more preferably, said transmission frequency may comprise any one of a predetermined data transmission frequency and a predetermined carrier frequency.

According to a second embodiment of the present invention, there is provided a RFID tag assembly for an RFID system according to the first embodiment of the invention, the RFID tag assembly comprising at least one tag inductance element operatively coupled to an integrated circuit (IC), at least one resonance element, operatively coupled to a predetermined capacitance of said tag assembly, and inductively coupleable to said at least one tag inductance element, so as to allow coupled magnetic resonance signal transmission between said tag assembly and at least one RFID reader assembly. Preferably, said coupled magnetic resonance signal transmission may be a strongly-coupled magnetic resonance (SCMR) signal transmission.

Advantageously, said predetermined capacitance may be tuneable.

Advantageously, said at least one tag inductance element may be any one of a Near-Field Communication (NFC) antenna and a RFID antenna. Advantageously, said at least one tag inductance element and said at least one resonance element may each be provided by any one of at least one single loop coil and at least one spiral coil.

Advantageously, said at least one tag inductance element may be arranged concentrically with said at least one resonance element. Preferably, said at least one tag inductance element and said at least one resonance element may be of a planar or two-dimensional shape.

Advantageously, said IC may be a flexible integrated circuit. Additionally, said IC may be any one of an NMOS (n-type metal oxide semiconductor) or PMOS (p-type metal oxide semiconductor) circuit.

BRIEF DESCRIPTION OF THE DRAWINGS

Preferred embodiments of the present invention will now be described, by way of example only and not in any limitative sense, with reference to the accompanying drawings, in which.

DETAILED DESCRIPTION OF THE PREFERRED EMBODIMENT(S)

The exemplary embodiments of this invention will be described in relation to RFID systems, and in particular to RFID systems using passive tag(s) configured to receive power from an interrogating reader. However, it is understood by a person skilled in the art that any other suitable tags may be used in connection with this invention. For example, the RFID system of the present invention may comprise one or more of any one of a passive, semi-passive and active tag operating over any suitable RFID protocol. Also, it is understood that the scope of the invention is not limited only to the structure of the described example embodiment(s).

Figure 1:
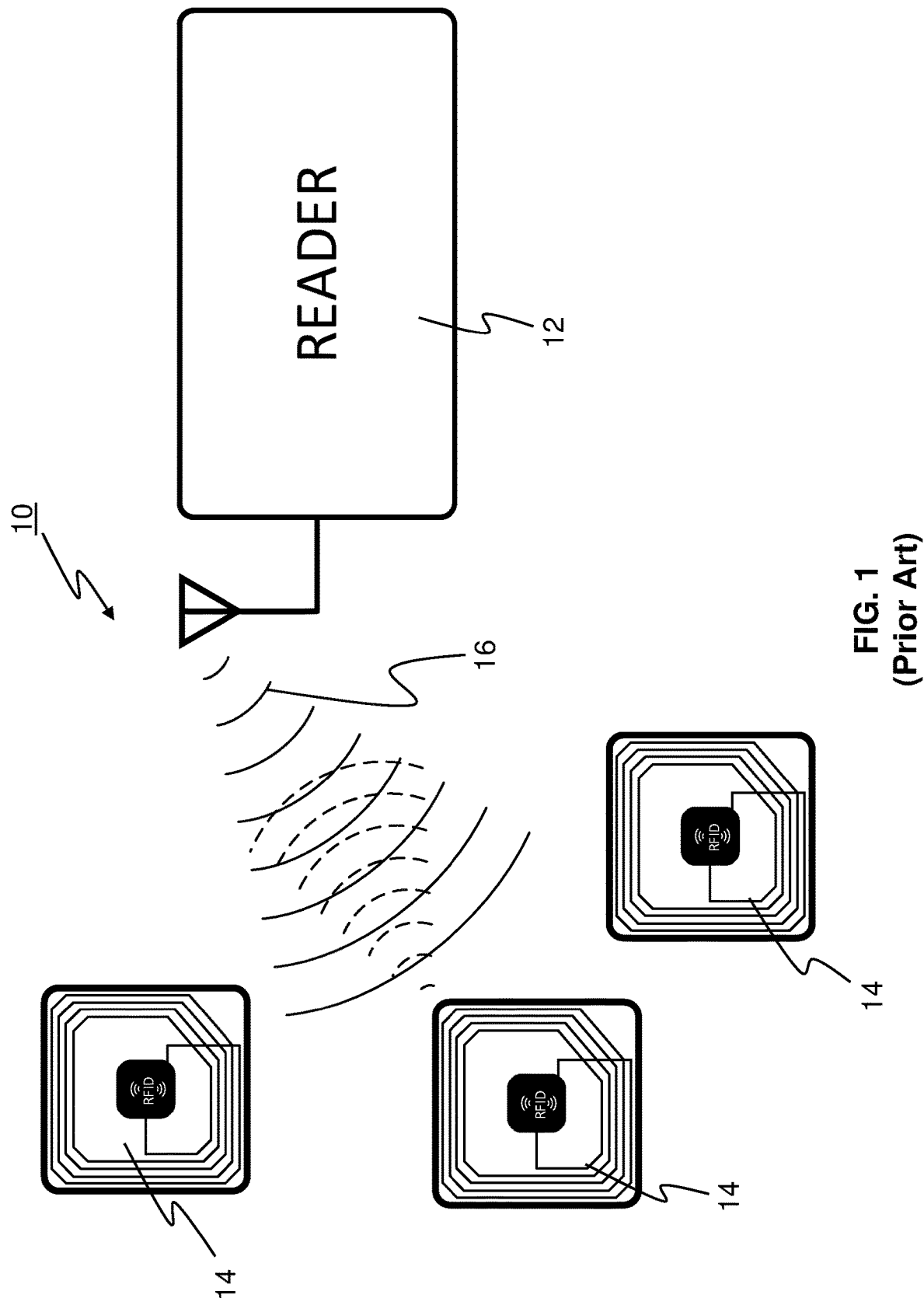
FIG. 1 (Prior Art) is a simplified schematic illustration of a typical RFID system, including a reader (or interrogator) and a plurality of passive tags, with one tag being interrogated by the reader's RF signal.
Figure 2:
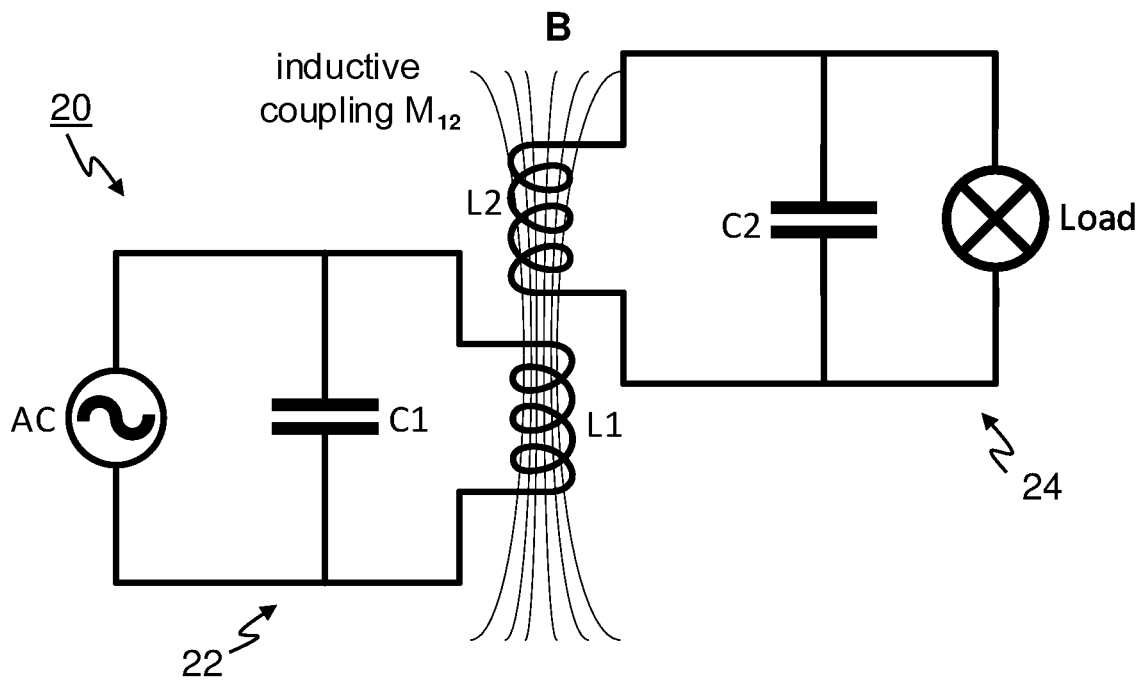
FIG. 2 (Prior Art) shows a simplified schematic illustration of inductive coupling between a transmitter and a receiver (load)
Figure 3:
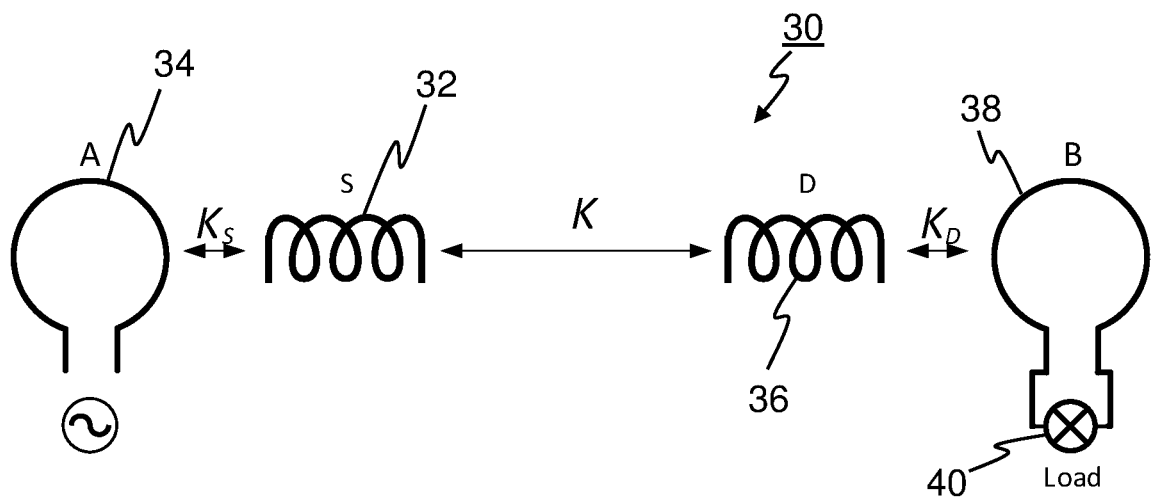
FIG. 3 (Prior Art) shows a simplified schematic illustration of a strongly coupled magnetic resonance (SCMR) between a resonant source coil (S) and a resonant device coil (D), where a single wire loop (A) is directly coupled ($K_S$) to the source coil (S) and a single wire loop (B) with a load is directly coupled ($K_D$) to the device coil (D)
Figure 4:
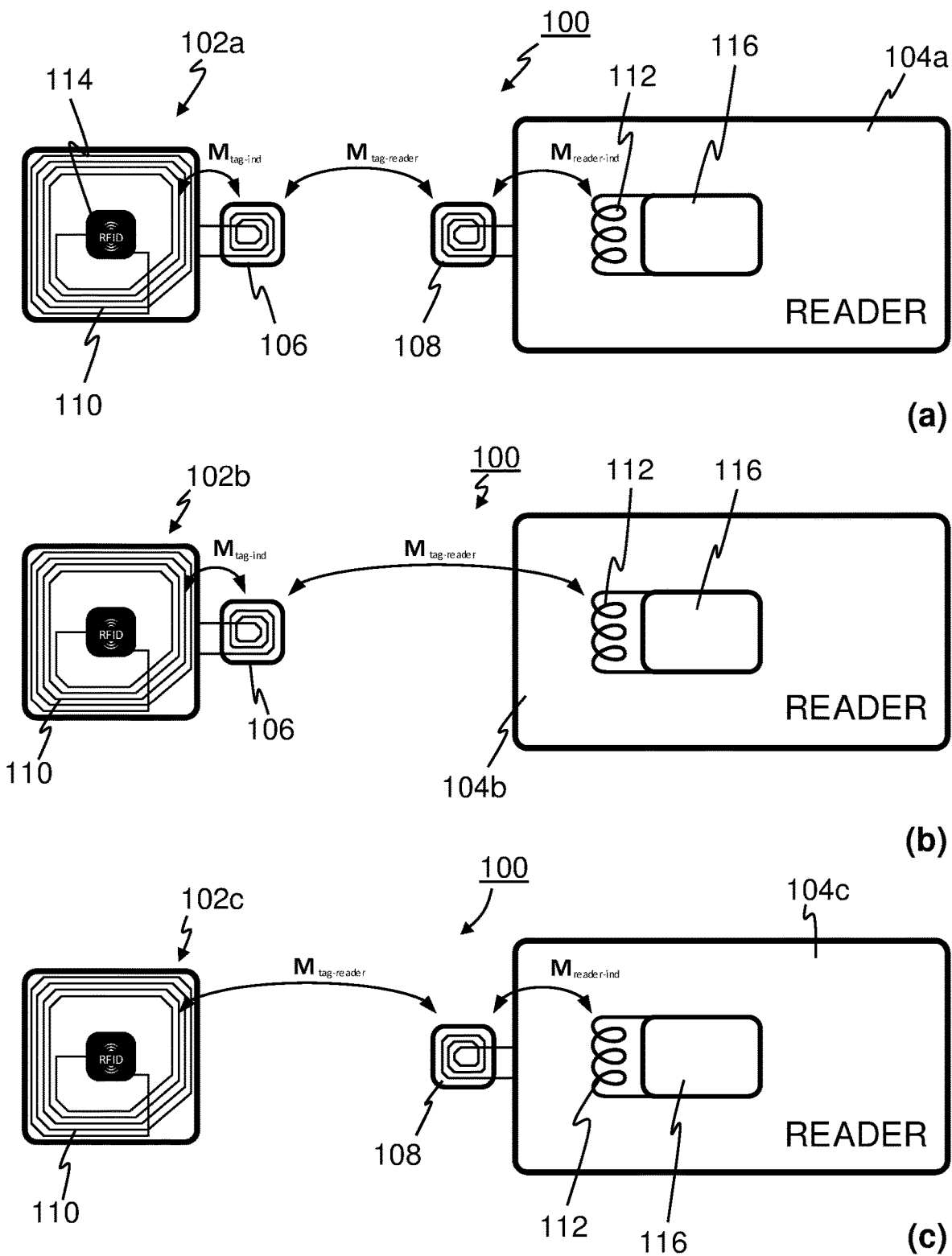
FIGS. 4a-4c show a simplified schematic illustration of (a) an embodiment where a tag and reader comprise resonance elements for SCMR, (b) an embodiment where only a tag comprises a resonance element to resonantly couple with a reader, and (c) an embodiment where only a reader comprises a resonance element to resonantly couple with at least one tag.

FIGS. 4(a), (b) and (c) illustrate exemplary embodiments of the RFID system 100 of the present invention. An RFID system 100 encompassing the basic inventive concept comprises at least one tag 102 and at least one reader 104, wherein the tag 102 and reader 104 are configured to couple magnetic-resonantly, so as to provide a signal transmission with much improved wireless power transfer, as well as, tag/reader functionality and structural antenna design.

In a first embodiment, as shown in FIG. 4(a), the RFID system 100 comprises at least one tag 102a having at least one tag resonance element 106 (e.g. a coil or simple loop antenna) and at least one reader 104a having at least one reader resonance element 108 (e.g. a coil or simple loop antenna). Both, tag 102a and reader 104a each comprise an inductance element (e.g. a coil or simple loop antenna) 110, 112 operatively coupled to respective IC (Integrated Circuit) 114 or controller 116. The tag inductance element 110 is configured to inductively couple with the tag resonance element 106, and the reader inductance element 112 is configured to inductively couple with the reader resonance element 108. Both, the reader resonance element 108 and the tag resonance element 106 are configured to couple resonantly to each other. Preferably, in the embodiment shown in FIG. 4(a), the tag 102a is configured to establish strong resonant magnetic coupling (SCMR) with the reader 104a.

However, it is understood by the person skilled in the art that both, inductance element 110, 112 and resonance element 106, 108 are antennas (coil, loop etc) of similar or identical design and may therefore be adapted to couple inductively and resonantly, though, the resonance elements are specifically designed (i.e. dimension, number of loops, material etc.) to particularly advance resonant coupling and strongly-coupled magnetic resonant (SCMR), wherein any resonant coupling through the inductance elements will be "weaker".

Consequently, the advantages of the present invention may also be achieved with any one of the other embodiments shown in FIGS. 4(b) and (c). In particular, FIG. 4(b) illustrates an example embodiment of the RFID system 100 wherein only the at least one tag 102b comprises a resonance element 106 that is inductively coupleable to its inductance element 110, and resonantly coupleable to any one of the reader's 104b antennas, i.e. inductance element 112 (e.g. a coil or simple loop antenna). Further, as mentioned above, the tag's inductance element 110 may also couple with any one of the reader's antennas, such as the inductance element 112, though, the coupling may be considerably weaker than the coupling between the resonance element 106 and the reader's inductance element 112.

FIG. 4(c) shows a simplified illustration of another example RFID system 100 incorporating the inventive concept of the present invention. In particular, only the at least one reader 104c comprises a resonance element 108 inductively coupleable to its inductance element 112 and resonantly coupleable with the tag's antenna, e.g. the tag's inductance element 110. As mentioned for the embodiment shown in FIG. 4(b), the reader's inductance element 112 may also couple with the tag's antenna, i.e. the inductance element 110, though, the coupling may be considerably weaker than the coupling between the resonance element 108 and the tag's inductance element 110.

Also, FIGS. 4(a), (b) and (c) only show simplified illustrations of example RFID systems and not the actual structural design of the components of the inventive RFID system 100. So, the key element of the present invention is the use of dual antennas (e.g. 106 and 110, and/or 112 and 108) in the RFID tag 102 and/or the reader 104, one (e.g. inductance element 110) to couple into the second (e.g. resonance element 106) and the second (e.g. resonance element 106) to couple resonantly with an antenna (e.g. any one of reader inductance element 112 and reader resonance element 108) of the RFID reader 104.

Furthermore, it is understood that any one of the reader(s) 104 and tag(s) 102 may comprise more than one inductance element 110, 112 or more than one resonance element 106, 108. In addition, either one of the tag 102 and reader 104 may be configured to selectively utilise any one of its inductance element(s) 110, 112 and resonance elements 106, 108 according to a predetermined condition (e.g. stored in the tag's IC or reader's controller). The predetermined condition may be a specific characteristic of the RF signal provided by the reader 104. For example, a specific signal amplitude or frequency may be used by the tag's IC to decide whether to couple via the inductance element 110 or the resonance element 106. However, it is understood by the person skilled in the art that any other suitable signal characteristic or parameter (e.g. ambient temperature, interference etc) may be used to select a suitable antenna element (i.e. inductance element 110 or resonance element 106).

Figure 5:
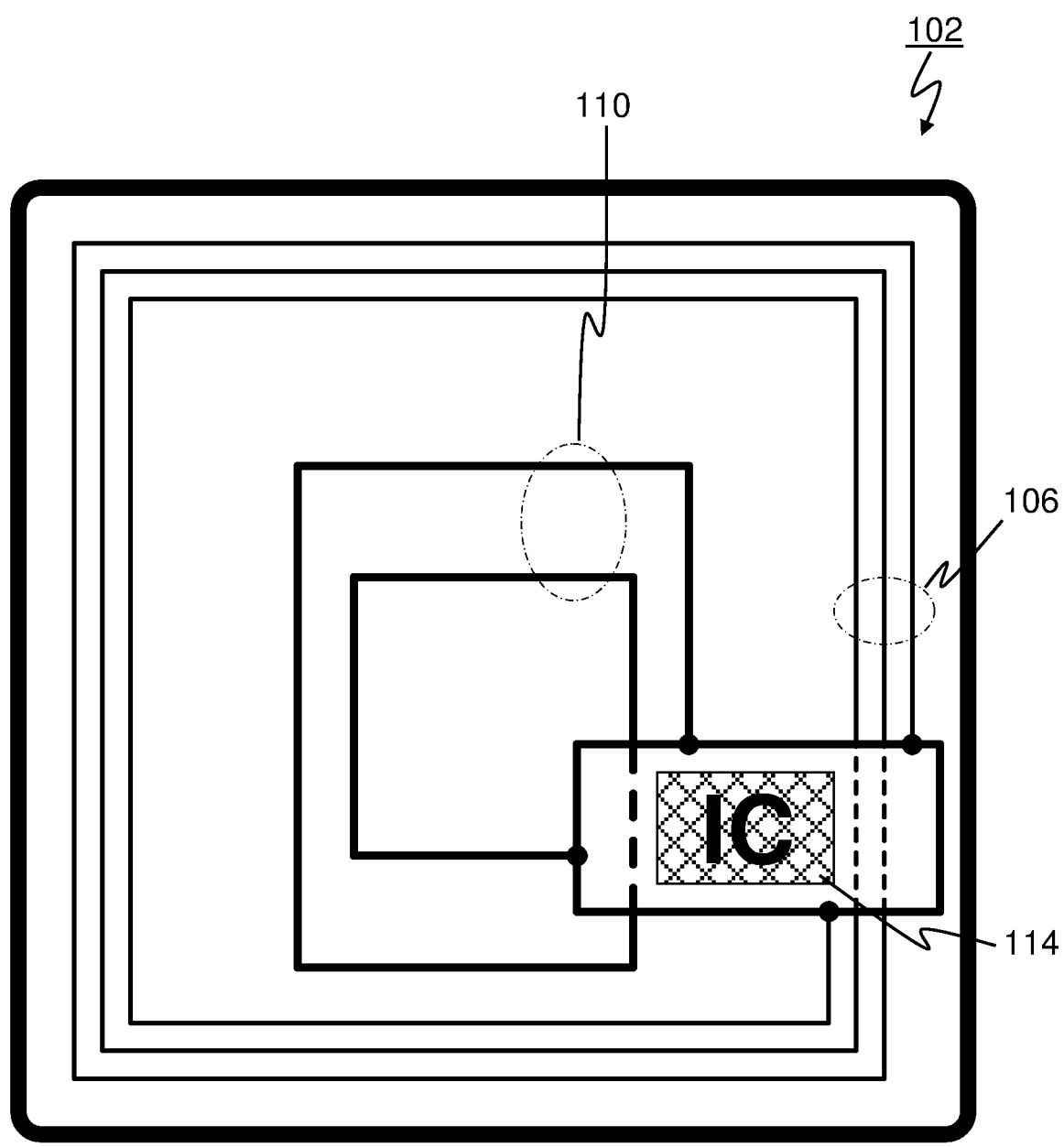
FIG. 5 shows a simplified schematic illustration of an example tag design, comprising a dual antenna (wired loops) for inductive and resonant coupling, wherein the inductive loop is operatively coupled to the "on-board" Integrated Circuit (e.g. FlexIC) and the resonant loop is embedded concentrically with the inductive loop.

Referring now to FIG. 5, a simplified illustration of an example tag antenna design is shown. Typical components of a RFID tag are known and not shown or described in any more detail. Here, the tag 102 comprises, inter alia, resonance element 106 in the form of a looped antenna structure (e.g. printed design) that is located outside (e.g. concentrically) the inductance element 110 in the form of another looped antenna structure. The inductance element 110 may be a standard NFC antenna. The inductance element 110 is operatively coupled with the IC 114, so as to allow load modulation of the RF signal provided by the reader 104 either directly or via the tag's resonance element 106.

The resonance element 106 may only be structurally coupled to the IC 114 so as to utilise the IC 114 structure to provide a predetermined (fixed) capacitance that is suitable for the resonance element 106 to resonantly couple with any one of the antenna(s) of the at least one reader 104. In particular, a suitable capacitance may be formed on, but not electrically coupled with (i.e. it does not connect to any of the IC's circuitry), the IC 114. Alternatively, the capacitance may not be formed on the IC 114.

Furthermore, the IC capacitance for the resonance element 106 may be tuneable, so as to allow an optimised resonant coupling with different reader antennas. The capacitance may be tuned by programming it via the IC 114 or by directly "trimming" it optically or electronically.

Also, instead of using an IC 114 "on-board" or a separate capacitance to tune a resonance element, any one of the resonance elements 106, 108 may be used as a self-resonant coil that is not coupled to the IC 114.

HF-RFID tags—general overview:

It is known that NFC operates with a 13.56 MHz carrier frequency (HF), and in low cost IC technologies, for example unipolar technologies ("nmos" or "pmos"), this requires a power-hungry clock divider circuit to produce a clocking frequency that is low enough to reduce IC power consumption to suitable levels. Low cost IC switches may dissipate a large amount of power when switching at 13.56 MHz. Data transmission back to a NFC reader is, by the NFC standard, at 106 Kbps, therefore, setting the lower limit on the clocking frequency.

Consequently, in order to provide a simpler and less power-hungry RFID IC, an on-board clock generator may be used at a frequency (e.g. nominally 848 kHz) that reduces switching power dissipation in comparison to the use of a clock divider. To further reduce the demands on low cost IC technologies, the RFID system may be designed to work with a range of carrier frequencies and data transmission rates so that the on-board clock does not require a "tight" specification. This means that a compatible reader may transmit at any frequency in the bandwidth of the tag antenna (i.e. the tag will rectify and harvest power at any frequency) and will detect data coming back from the tag 102 at any frequency within a relatively wide range. That frequency range may depend on the spread of clock frequencies in a production sample of ICs 114 and the bandwidths of the tag antennas. So, in low cost RFID systems, the reader 104 may transmit at 13.56 MHz (to borrow parts from NFC readers and tags), but "senses" data over a wider range of frequencies (in contrast to NFC, which is using exactly 106 Kbps due to its clock being derived from the carrier frequency).

Therefore, the tag 102 of the present invention may contain a single IC 114 that is configured to transmit data in both a standard or proprietary HF-RFID protocol and an NFC protocol. Alternatively, the tag 102 may comprise two different ICs 114, one for each protocol, but both coupled via the resonance element 106.

During operation, the tag IC 114 would wake up when sufficient power is received from the reader 104, whether it is via a NFC reader or a different HF-RFID reader.

Once awake the IC 114 could either (i) infer which protocol it needs to follow from the nature (a characteristic) of the received signal (e.g. by detecting its frequency), or (ii) respond sequentially in two or more protocols (e.g. NFC protocol and different HF-RFID protocol). Further, distance differentiation between the tag(s) 102 and reader(s) 104 may arise in that the IC(s) 114 is/are powered up by either an NFC reader 104b (e.g. mobile phone) at relatively close range, since the mobile phone does not normally have a resonance element 108 of the present invention, or by a RFID reader 104 at relatively long range, as that reader has a resonance element 108. The reader 104 may only decode the data sent in its respective protocol, therefore, keeping the functionalities separate.

Figure 6:
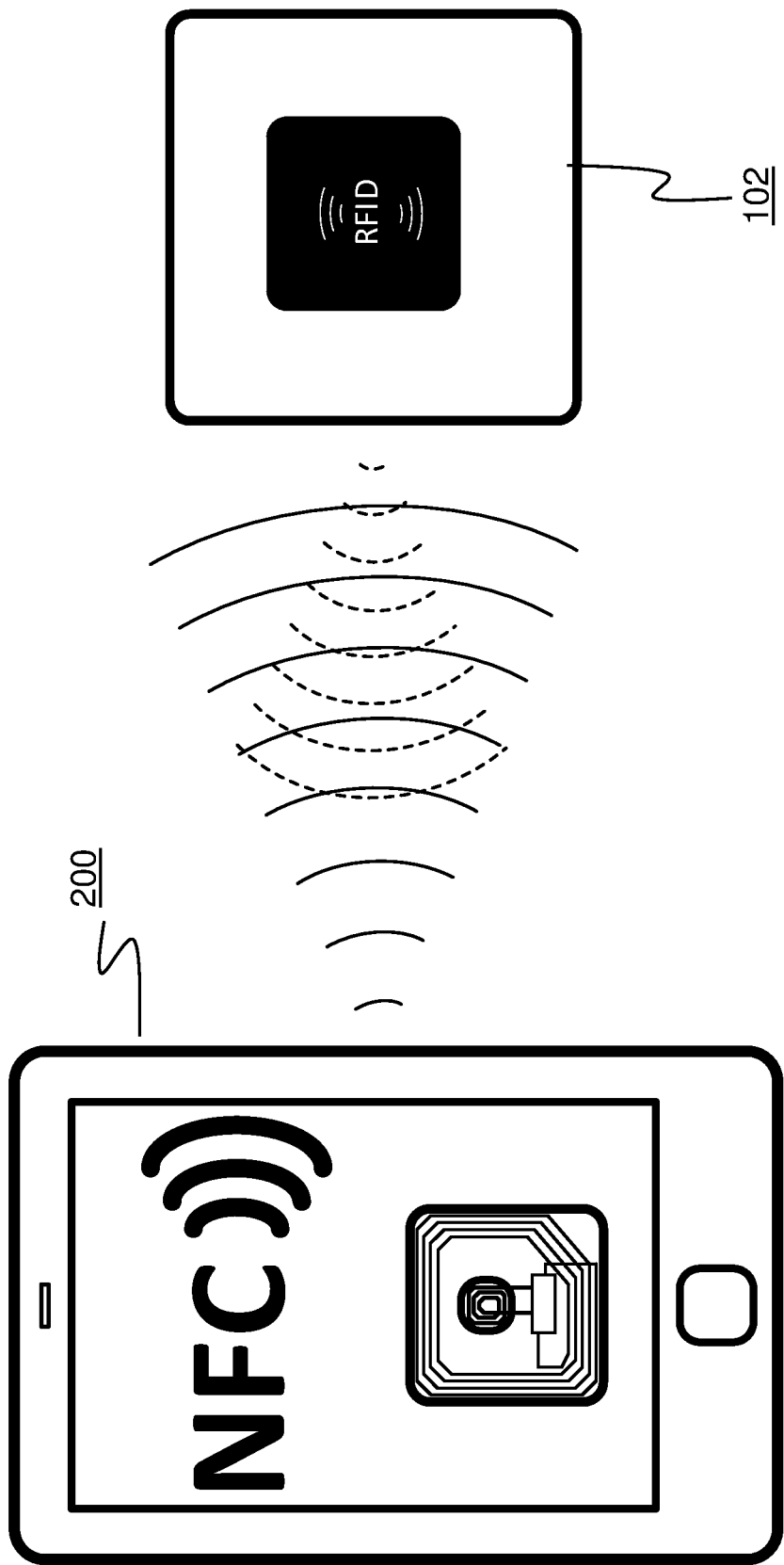
FIG. 6 shows an example RFID system of the present invention utilising a tag for dual use NFC and RFID, where the tag is selectively useable as NFC tag (e.g. with mobile phones), but also as a "long distance" RFID tag (e.g. with HF readers for supply chain tracking).

FIG. 6 shows an example RFID system comprising a dual-mode mobile phone 200, configured to selectively use NFC, as well as, resonant coupling (e.g. SCMR), and one or more tag(s) 102, with or without one or more resonance elements 106 (not shown).

Further, the RFID system 100 of the present invention may be configured to selectively utilise any one of the inductance elements 110, 112 and/or resonance elements 106, 108 of respective tag(s) 102 and reader(s) 104 so as to provide optimised wireless power transfer, as well as, information exchange. The combination of antennas (i.e. inductance or resonance elements of tag and reader) may be selected in accordance with a predetermined condition, such as, for example, a specific RF signal characteristic of the RF signal provided by the reader 104, or the availability of a resonance element at the tag 102 and/or reader 104. The signal characteristic that may determine which antennas are best for an optimised signal transmission between the reader 104 and tag 102 may be any one of a signal amplitude and/or frequency, or any other suitable signal parameter.

So, in general, any one of the embodiments of the RFID system 100 of the present invention may be applied, so as to offer (i) an increase in the power received by an RFID IC 114, (ii) an increase in the RFID tag 102 to RFID reader 104 separation, (iii) a possible reduction in the size of the RFID tag antenna (or combination of antennas) 106, 110, (iv) an increase in the sensitivity of the RFID reader 104 to communications from the RFID tag 102, and (v) an economical dual-mode RFID tag 102 operation.

In particular, extension of the operable range (from a reader 104) for existing RFID ICs 114, where the coupling between reader 104 and tag 102 is enhanced by using a new antenna arrangement (e.g. 110/106, 112/108) at the tag 102 and/or at the reader 104 enabling communication between them over a greater distance. This may be considered to be equivalent to an alleviation of minimum IC 114 power consumption requirements to achieve a given operable range, since the signal received at the IC 114 is larger for a given distance from the reader 104. The different embodiments include, (i) double antennas (106/110, 108/112) attached to the tag IC 114 and to the reader 104, (ii) a double antenna (106/110) at the tag IC 114 and a single antenna 112 at the reader 104, and (iii) a double antenna (108, 112) at the reader 104 and a single antenna 110 at the tag IC 114.

NFC application may include using a standard mobile phone and a low-cost IC-based NFC Tag. This application only uses a dual-antenna design at the tag 102 side, but not at the reader/phone side, still providing a significant improvement, e.g. in unoptimized early experiments this approach has shown a range extension of between two-times and five-times compared to a standard silicon tag and standard NFC smartphone. Consequently, this will allow a significant increase of the power available to the IC 114 (e.g. by 50% to 100%) for the same distance, such as, mobile phone-to-tag range, without changing the low-cost NFC IC design. The additional power may enable, for example, enhanced IC functionality (e.g. sensing, processing) or the use of less power-efficient IC technologies. This approach would also or instead potentially allow the reduction of the required overall RFID tag antenna size.

Other HF-RFID applications may include custom reader(s) and low-cost IC-based tag(s) 102, using dual-antenna design at both the tag 102 and reader 102. This provides for increased operating range to over 50 cm with an acceptable customer reader power, and therefore open up potential applications that are currently not possible without such a range, e.g. inventory tracking. Anti-collision protocols may be required to make effective use of this extended range, since multiple tags 102 may be simultaneously in the operational volume of the reader 104.

The present invention provides for dual-use of NFC and other RFID protocol tags 102. An example might be the dual use of NFC and supply chain tracking. A dual NFC/supply chain tracking IC may therefore be only marginally more complex than any one of the other suitable IC's and may enable a tag 102 to work as an NFC tag with mobile phones (NFC reader), but also to work as a "long"-distance supply chain tracking tag when exposed to a suitable reader. So, the same tag 102 could then provide both customer engagement/authentication and stock control/management.

It will be appreciated by persons skilled in the art that the above embodiment(s) have been described by way of example only and not in any limitative sense, and that various alterations and modifications are possible without departing from the scope of the invention as defined by the appended claims.

Below, there is provided a non-exhaustive list of non-limiting aspects. Any one or more of the features of these examples may be combined with any one or more features of another aspect, embodiment or aspect described herein.

Aspects

1. A RFID (Radio Frequency Identification) system, comprising:
at least one tag assembly, comprising at least one tag inductance element operatively coupled to an integrated circuit (IC);
at least one reader assembly, comprising at least one reader inductance element, configured to operatively and communicatively couple with said tag assembly, and
a resonance assembly, comprising at least one first resonance element inductively coupleable to said at least one tag inductance element and/or at least one second resonance element inductively coupleable to said at least one reader inductance element, and which is adapted to provide coupled magnetic resonance signal transmission between said reader assembly and said tag assembly.

2. A RFID system according to aspect 1, wherein said coupled magnetic resonance signal transmission is strongly-coupled magnetic resonance (SCMR) signal transmission.

3. A RFID system according to any one of the preceding aspects, wherein, when said resonance assembly comprises only said at least one first resonance element, said at least one first resonance element is adapted to couple resonantly with said at least one reader inductance element.

4. A RFID system according to any one of aspects 1 and 2, wherein, when said resonance assembly comprises only said at least one second resonance element, said at least one second resonance element is adapted to couple resonantly with said at least one tag inductance element.

5. A RFID system according to aspect 2, wherein, when said resonance assembly comprises both said at least one first resonance element and said at least one second resonance element, said at least one first resonance element is adapted to couple resonantly with any one of said at least one second resonance element and said at least one reader inductance element of said at least one reader assembly, and, said at least one second resonance element is adapted to couple resonantly with any one of said at least one first resonance element and said at least one tag inductance element of said at least one tag assembly.

6. A RFID system according to aspect 5, further adapted to selectively utilise any one or any combination of said at least one tag inductance element, said at least one first resonance element, said at least one reader inductance element and said at least one second resonance element to provide strongly-coupled magnetic resonance (SCMR) signal transmission between said at least one reader assembly and said at least one tag assembly.

7. A RFID system according to aspect 6, wherein any one or any combination of said at least one tag inductance element, said at least one first resonance element, said at least one reader inductance element and said at least one second resonance element is selected in accordance with at least one predetermined condition.

8. A RFID system according to aspect 7, wherein said at least one predetermined condition is a predetermined characteristic of the signal transmission between said reader assembly and said tag assembly.

9. A RFID system according to aspect 8, wherein said predetermined characteristic is any one of a predetermined signal frequency and signal amplitude.

10. A RFID system according to any one of aspects 5 to 9, wherein at least one characteristic property of said at least one first and said at least one second resonance element is optimally matched for strongly-coupled magnetic resonance (SCMR) signal transmission.

11. A RFID system according to aspect 10, wherein said at least one characteristic property is a respective impedance of said at least one first resonance element and said at least one second resonance element.

12. A RFID system according to any one of aspects 3 and 5 to 11, wherein said at least one first resonance element is operatively coupled to a first capacitance of said at least one tag assembly.

13. A RFID system according to aspect 12, wherein said first capacitance is selectively tuneable.

14. A RFID system according to any one of aspects 4 to 11, wherein said at least one second resonance element is operatively coupled to a second capacitance of said at least one reader assembly.

15. A RFID system according to aspect 14, wherein said second capacitance is selectively tuneable.

16. A RFID system according to any one of the preceding aspects, wherein said resonance assembly is configured to provide power to said at least one tag assembly and exchange information between said at least one reader assembly and said at least one tag assembly.

17. A RFID system according to aspect 16, wherein said at least one resonance assembly is configured to exchange information via load modulation.

18. A RFID system according to any one of the preceding aspects, wherein said at least one tag inductance element is any one of a Near-Field Communication (NFC) antenna and a RFID antenna.

19. A RFID system according to any one of the preceding aspects, wherein said reader inductance element is any one of a Near-Field Communication (NFC) antenna and a HF (High Frequency) RFID antenna.

20. A RFID system according to any one of the preceding aspects, wherein said at least one tag inductance element, said at least one reader inductance element, said at least one first resonance element and said at least one second resonance element are each provided by any one of at least one single loop coil and at least one spiral coil.

21. A RFID system according to any one of the preceding aspects, wherein said IC of said at least one tag assembly is adapted to operate with at least one RFID protocol utilising at least one predetermined transmission frequency.

22. A RFID system according to aspect 21, wherein said IC of said at least one tag assembly is adapted to operate with a plurality of different RFID protocols.

23. A RFID system according to aspect 22, wherein each one of said plurality of different RFID protocols is configured to utilise an identical or a different predetermined transmission frequency.

24. A RFID system according to any one of aspects 22 and 23, wherein said IC is further adapted to selectively utilise any one of said plurality of different RFID protocols.

25. A RFID system according to any one of aspects 1 to 20, wherein said at least one tag assembly comprises a first IC, adapted to operate with a first RFID protocol at a predetermined first transmission frequency, and at least one second IC, adapted to operate with a second RFID protocol at a predetermined second transmission frequency.

26. A RFID system according to aspect 25, wherein said at least one tag assembly is adapted to selectively utilise any one of said first IC and said at least one second IC.

27. A RFID system according to any one of aspects 21 to 26, wherein said transmission frequency comprises any one of a predetermined data transmission frequency and a predetermined carrier frequency.

28. A RFID tag assembly for an RFID system according to any one of the preceding aspects, comprising:
at least one tag inductance element operatively coupled to an integrated circuit (IC);
at least one resonance element, operatively coupled to a predetermined capacitance of said tag assembly, and inductively coupleable to said at least one tag inductance element so as to allow coupled magnetic resonance signal transmission between said tag assembly and at least one RFID reader assembly.

29. A RFID tag assembly according to aspect 28, wherein said coupled magnetic resonance signal transmission is a strongly-coupled magnetic resonance (SCMR) signal transmission.

30. A RFID tag assembly according to any one of aspects 28 and 29, wherein said predetermined capacitance is tuneable.

31. A RFID tag assembly according to any one of aspect 28 to 30, wherein said at least one tag inductance element is any one of a Near-Field Communication (NFC) antenna and a RFID antenna.

32. A RFID tag assembly according to any one of aspects 28 to 31, wherein said at least one tag inductance element and said at least one resonance element are each provided by any one of at least one single loop coil and at least one spiral coil.

33. A RFID tag assembly according to any one of aspects 28 to 32, wherein said at least one tag inductance element is arranged concentrically with said at least one resonance element.

34. A RFID tag assembly according to any one of aspects 28 to 33, wherein said at least one tag inductance element and said at least one resonance element are of a planar or two-dimensional shape.

35. A RFID tag assembly according to any one of aspects 28 to 34, wherein said IC is a flexible integrated circuit.

36. A RFID tag assembly according to any one of aspects 28 to 35, wherein said IC is an NMOS (n-type metal oxide semiconductor) circuit.

The invention claimed is:

1. A RFID (Radio Frequency Identification) system, comprising:
 at least one tag assembly, comprising at least one tag inductance element operatively and directly conductively coupled to an integrated circuit (IC);
 at least one reader assembly, comprising at least one reader inductance element, configured to operatively and communicatively couple with said tag assembly, and
 a resonance assembly, comprising at least one first resonance element inductively coupleable to said at least one tag inductance element and/or at least one second resonance element inductively coupleable to said at least one reader inductance element, and which is adapted to provide strongly-coupled magnetic resonance (SCMR) signal transmission between said reader assembly and said tag assembly.

2. A RFID system according to claim 1, wherein, when said resonance assembly comprises only said at least one first resonance element, said at least one first resonance element is adapted to couple resonantly with said at least one reader inductance element.

3. A RFID system according to claim 2, wherein said at least one first resonance element is operatively coupled to a first capacitance of said at least one tag assembly.

4. A RFID system according to claim 3, wherein said first capacitance is selectively tuneable.

5. A RFID system according to claim 1, wherein, when said resonance assembly comprises only said at least one second resonance element, said at least one second resonance element is adapted to couple resonantly with said at least one tag inductance element.

6. A RFID system according to claim 5, wherein said at least one second resonance element is operatively coupled to a second capacitance of said at least one reader assembly.

7. A RFID system according to claim 6, wherein said second capacitance is selectively tuneable.

8. A RFID system according to claim 1, wherein, when said resonance assembly comprises both said at least one first resonance element and said at least one second resonance element, said at least one first resonance element is adapted to couple resonantly with any one of said at least one second resonance element and said at least one reader inductance element of said at least one reader assembly, and, said at least one second resonance element is adapted to couple resonantly with any one of said at least one first resonance element and said at least one tag inductance element of said at least one tag assembly.

9. A RFID system according to claim 8, further adapted to selectively utilise any one or any combination of said at least one tag inductance element, said at least one first resonance element, said at least one reader inductance element and said at least one second resonance element to provide strongly-coupled magnetic resonance (SCMR) signal transmission between said at least one reader assembly and said at least one tag assembly.

10. A RFID system according to claim 9, wherein any one or any combination of said at least one tag inductance element, said at least one first resonance element, said at least one reader inductance element and said at least one second resonance element is selected in accordance with at least one predetermined condition.

11. A RFID system according to claim 1, wherein said resonance assembly is configured to provide power to said at least one tag assembly and exchange information between said at least one reader assembly and said at least one tag assembly.

12. A RFID system according to claim 1, wherein said IC of said at least one tag assembly is adapted to operate with at least one RFID protocol utilising at least one predetermined transmission frequency.

13. A RFID system according to claim 1, wherein said IC of said at least one tag assembly is adapted to operate with a plurality of different RFID protocols, and wherein each one of said plurality of different RFID protocols is configured to utilise an identical or a different predetermined transmission frequency, and wherein said IC further adapted to selectively utilise any one of said plurality of different RFID protocols.

14. A RFID system according to claim 1, wherein said at least one tag assembly comprises a first IC, adapted to operate with a first RFID protocol at a predetermined first transmission frequency, and at least one second IC, adapted to operate with a second RFID protocol at a predetermined second transmission frequency.

15. A RFID system according to claim 14, wherein said at least one tag assembly is adapted to selectively utilise any one of said first IC and said at least one second IC.

16. A RFID system according to claim 14, wherein said transmission frequency comprises any one of a predetermined data transmission frequency and a predetermined carrier frequency.

17. A RFID tag assembly for an RFID system according to claim 1, comprising:
 at least one tag inductance element operatively coupled to an integrated circuit (IC);
 at least one resonance element, operatively coupled to a predetermined capacitance of said tag assembly, and inductively coupleable to said at least one tag inductance element so as to allow coupled magnetic resonance signal transmission between said tag assembly and at least one RFID reader assembly providing power to said at least one tag assembly and information exchange between said at least one reader assembly and said at least one tag assembly.

18. A RFID tag assembly according to claim 17, wherein said coupled magnetic resonance signal transmission is a strongly-coupled magnetic resonance (SCMR) signal transmission.

19. A RFID tag assembly according to claim 17, wherein said predetermined capacitance is tuneable.

* * * * *